Patented May 21, 1935

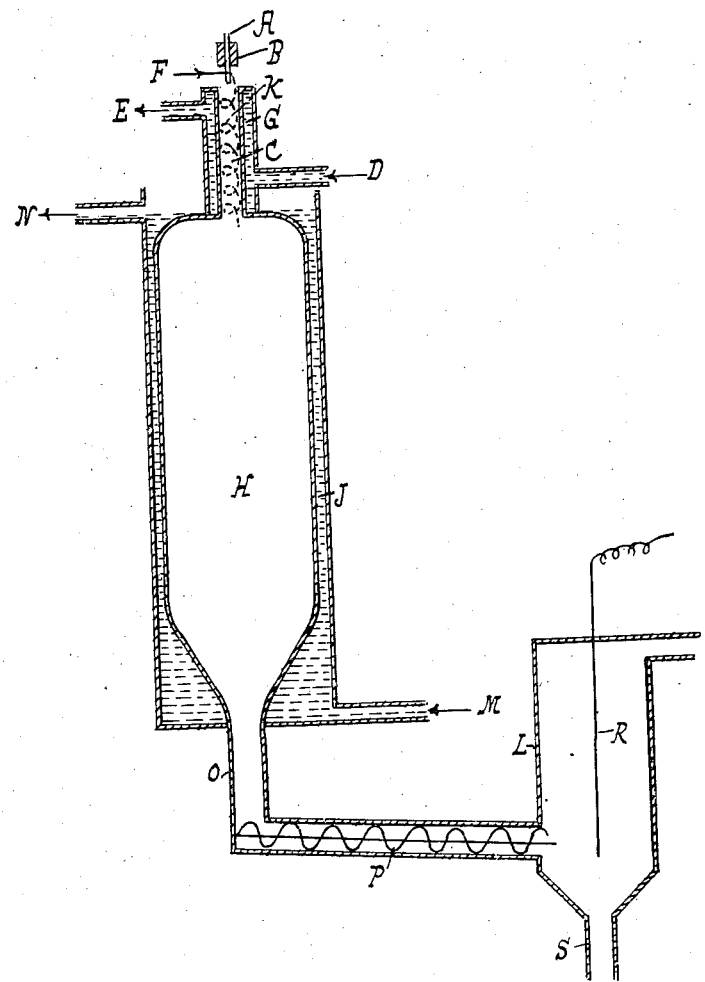

2,002,003

UNITED STATES PATENT OFFICE 2,002,003

PRODUCTION OF ACETYLENE AND CARBON BLACK

Otto Eisenhut, Heidelberg, and Heinrich Schilling and Paul Baumann, Ludwigshafen-on-the-Rhine, Germany, assignors to I. G. Farbenindustrie Aktiengesellschaft, Frankfort-on-the-Main, Germany Application September 19, 1931, Serial No. 563,784
In Germany September 20, 1930

8 Claims. (Cl. 204—31)

The present invention relates to improvements in the production of acetylene and carbon black.

In the thermal production of acetylene from gaseous or vaporous hydrocarbons (hereinafter referred to as vaporized hydrocarbons) such as methane or natural gas, fractions of natural gas, coke oven gas or fractions of coke oven gas, especially in the electric arc, more or less large amounts of carbon black are also usually formed. This formation of carbon black may have an injurious effect on the continuous production of acetylene since large amounts of the carbon black may be precipitated on the cooling elements used for cooling the acetylene and thus prevent efficient heat conduction. A rapid cooling of the acetylene is necessary, however, in order to prevent subsequent decomposition or polymerization thereof, reactions which are catalytically accelerated by certain solid materials, as for example the walls of the apparatus, and especially by the carbon black formed.

We have now found that a good cooling of the reaction gases containing acetylene leaving the electric arcs, with the production of a high yield of acetylene and while recovering a valuable carbon black is effected when the reaction gas mixture containing carbon black is led, directly after leaving the electric arc, into a cooled large hollow space, in which it is set in whirling motion and in which it is cooled, by mixing with the cool gaseous constituents already present in motion in the hollow space and, if desired, also by means of cooling agents, such as water, passed around said hollow space and separating the carbon black from the gaseous constituents of the mixture, after the mixture leaves the hollow space. The volume of the said large hollow space should be more than 100 times, preferably more than 500 times, larger than the volume of the arc space. The area of the cross-section of this large space is usually more than 8 times, preferably more than 40 times, greater than the cross-section-area of the arc space. The ratio of the amount of gas measured in cubic meters, which is passed hourly through the electric arc to the power of the arc measured in kilowatts should preferably lie below about 0.60.

It has been found that by cooling in this manner, the decomposition of acetylene usually observed in the presence of solid substances does not take place in an appreciable degree so that excellent yields of acetylene are obtained. During the cooling in the hollow space the carbon black remains extremely finely dispersed in the gas mixture and may be carried along for considerable distances without any appreciable amount thereof being deposited. The walls of the hollow chamber itself remain practically free from carbon black so that a continuous and uniform cooling action is ensured. The removal of the carbon black in order to obtain acetylene free from solid constituents may be effected for example mechanically or electrically at any desired place behind the hollow space. The mechanical separation may for example be effected by passing the gases through sieves, which are agitated, and the electrical separation by filtration in the known dust separators.

The carbon black obtained according to the present invention is an extremely valuable filler for the rubber industry; it is equal to good gas black and imparts a very great strength to the products prepared therewith. By reason of its deep black color it is eminently suitable for employment as a black coloring agent.

The following example will further illustrate the nature of this invention with reference to the accompanying drawing which shows an arrangement of apparatus according to this invention, but the invention is not restricted to this example or to the particular arrangement shown.

Example

The drawing illustrates diagrammatically in elevation and partly in section a plant for carrying out the process according to the present invention.

C is an arc furnace, which is cooled by means of water introduced at D and removed at E. A is an electrode insulated by an insulating layer B. G is the counter-electrode, which is connected with earth.

About 100 cubic meters per hour (measured under normal conditions) of a gas mixture containing hydrogen and about 50 per cent of methane are introduced tangentially into the arc space at F, thus being set into a state of whirling motion indicated by the dotted line K and are led through the said electric arc which is operated with about 100 kilowatts power. Directly below the water-cooled ends of the electric arc is situated a cylindrical hollow vessel H, externally cooled with water introduced at M and discharged at N. In this vessel H which is 600 millimeters in diameter and 2000 millimeters in length in the axis of the furnace and which is cooled on all sides by the cooling water J the state of whirling motion is maintained owing to the impetus of the gas. At the point of entry into said vessel H the reaction mixture has a temperature of about 1500° C. The waste gas from the electric arc leaves the hollow cooler with a temperature of 90° C. and passes to an electric dust-remover L arranged at some distance, where the carbon black is entirely removed from the gas. Any carbon black deposited at the bottom of the tube O is removed by means of a worm conveyor P and discharged, together with carbon black falling from the electrode R of the dust remover L, through outlet S. The yield of acetylene is from 68 to 70 liters per kilowatt hour. The yield of carbon black amounts to from 8 to 9 grams per kilowatt.

What we claim is:—

1. In the conversion of a vaporized hydrocarbon into acetylene and carbon black by treatment in the electric arc the step which comprises passing the mixture of gas and carbon black issuing from the arc space in a whirling motion directly into a large cooled free space, whereby the carbon black is maintained in suspension in said gas and prevented from depositing on the heat conducting surfaces defining said cooled space and then separating the carbon black from the gas.

2. In the conversion of a vaporized hydrocarbon into acetylene and carbon black by treatment in the electric arc the step which comprises passing the mixture of gas and carbon black issuing from the arc space in a whirling motion directly into a free space at least 100 times larger than the arc space and which is externally cooled by water, whereby the carbon black is maintained in suspension in said gas and prevented from depositing on the heat conducting surfaces defining said cooled space and then separating the carbon black from the gas.

3. In the conversion of a vaporized hydrocarbon into acetylene and carbon black by treatment in the electric arc the step which comprises passing the mixture of gas and carbon black issuing from the arc space in a whirling motion directly into a free space at least 500 times larger than the arc space and which is externally cooled by water, whereby the carbon black is maintained in suspension in said gas and prevented from depositing on the heat conducting surfaces defining said cooled space and then separating the carbon black from the gas.

4. In the conversion of a gas comprising methane into acetylene and carbon black by treatment in the electric arc the step which comprises passing the mixture of gas and carbon black issuing from the arc space in a whirling motion directly into a free space at least 500 times larger than the arc space and which is externally cooled by water, whereby the carbon black is maintained in suspension in said gas and prevented from depositing on the heat conducting surfaces defining said cooled space and then separating the carbon black from the gas.

5. An apparatus suitable for converting a vaporized hydrocarbon into acetylene and carbon black comprising a narrow chamber provided with two electrodes for producing an electric arc and a large free chamber communicably and directly connected with the lower end of said arc space and provided with cooling means, the cross-sectional area of the large chamber being so great with respect to the cross-sectional area of the arc chamber as to provide a large, free, cooled space through which the mixture of carbon black and gas issuing from the arc chamber can pass without any substantial deposition of carbon black on the walls of said large chamber.

6. An apparatus according to the preceding claim in which the large chamber is at least one hundred times larger than the arc chamber.

7. An apparatus according to claim 5 in which the large chamber is at least five hundred times larger than the arc chamber.

8. An apparatus suitable for converting a vaporized hydrocarbon into acetylene and carbon black comprising a narrow chamber provided with two electrodes for producing an electric arc and a large free chamber communicably and directly connected with said arc space at a point not immediately above it and provided with cooling means, the cross-sectional area of the large chamber being so great with respect to the cross-sectional area of the arc chamber as to provide a large, free, cooled space through which the mixture of carbon black and gas issuing from the arc chamber can pass without any substantial deposition of carbon black on the walls of said large chamber.

OTTO EISENHUT.
HEINRICH SCHILLING.
PAUL BAUMANN.